(12) United States Patent
Yamamoto et al.

(10) Patent No.: US 9,434,007 B2
(45) Date of Patent: Sep. 6, 2016

(54) MACHINE TOOL

(71) Applicant: Yamazaki Mazak Corporation, Niwa-gun (JP)

(72) Inventors: Tohru Yamamoto, Niwa-gun (JP); Yasushi Manabe, Niwa-gun (JP); Shingo Kizawa, Niwa-gun (JP); Masakazu Suzuura, Niwa-gun (JP)

(73) Assignee: YAMAZAKI MAZAK CORPORATION, Aichi (JP)

( * ) Notice: Subject to any disclaimer, the term of this patent is extended or adjusted under 35 U.S.C. 154(b) by 0 days.

(21) Appl. No.: 14/693,816

(22) Filed: Apr. 22, 2015

(65) Prior Publication Data
US 2015/0224580 A1 Aug. 13, 2015

Related U.S. Application Data

(63) Continuation of application No. PCT/JP2012/082986, filed on Dec. 20, 2012.

(51) Int. Cl.
*B23B 27/00* (2006.01)
*B23B 41/06* (2006.01)
(Continued)

(52) U.S. Cl.
CPC .............. *B23B 27/007* (2013.01); *B23B 7/12* (2013.01); *B23B 29/04* (2013.01); *B23B 29/14* (2013.01); *B23B 41/06* (2013.01); *B23B 29/12* (2013.01); *Y10T 82/2511* (2015.01)

(58) Field of Classification Search
CPC ....... B23B 27/007; B23B 7/12; B23B 29/12; B23Q 5/043; B23Q 5/045
See application file for complete search history.

(56) References Cited

U.S. PATENT DOCUMENTS 2,877,536 A * 3/1959 Monosmith ......... B23B 27/1633
407/110
3,156,967 A * 11/1964 Dansfield ................ B23B 27/16
142/56
(Continued)

FOREIGN PATENT DOCUMENTS

EP 1166931 1/2002
EP 1992434 A2 11/2008
(Continued)

OTHER PUBLICATIONS

International Search Report for corresponding International Application No. PCT/JP2012/082986, Jan. 22, 2013.
(Continued)

*Primary Examiner* — Will Fridie, Jr.
(74) *Attorney, Agent, or Firm* — Mori & Ward, LLP

(57) ABSTRACT

A machine tool includes a table, a spindle head, a spindle, and an internal turning attachment. The internal turning attachment includes an attachment base, a body, and a tool holder. The tool holder has a tool mount surface to which a turning tool is detachably mounted. The tool mount surface provides a changeable tool mount angle with respect to a plane perpendicular to a spindle rotational axis in a state where the internal turning attachment is mounted to the spindle head. An angle between the spindle rotational axis and a vertical axis is to be larger than zero degree according to the changeable tool mount angle and is fixed while the turning tool contacts a workpiece in a case where the workpiece has a hole with a depth exceeding a length from a body upper portion to a tip end of the turning tool along the spindle rotational axis.

6 Claims, 13 Drawing Sheets

(51) Int. Cl.
  *B23B 7/12*    (2006.01)
  *B23B 29/04*   (2006.01)
  *B23B 29/14*   (2006.01)
  B23B 29/00     (2006.01)
  B23B 29/12     (2006.01)

(56) References Cited

U.S. PATENT DOCUMENTS

| | | | | |
|---|---|---|---|---|
| 3,978,766 | A * | 9/1976 | Brennan, Jr. | B23B 5/46 409/291 |
| 4,510,829 | A * | 4/1985 | Kintzel | B23B 29/04 82/158 |
| 4,617,845 | A * | 10/1986 | Sasano | B23B 5/40 82/1.11 |
| 5,298,844 | A * | 3/1994 | Nagasaki | B23Q 1/4857 29/26 A |
| 6,352,496 | B1 * | 3/2002 | Oldani | B23Q 1/52 409/165 |
| 8,887,361 | B2 * | 11/2014 | Yu | B23P 23/02 29/27 C |
| 8,950,987 | B2 * | 2/2015 | Okada | B23B 35/00 409/132 |
| 2004/0110615 | A1 * | 6/2004 | Tan | B23Q 3/15706 483/55 |
| 2010/0242694 | A1 * | 9/2010 | Kitayama | B23B 3/10 82/121 |
| 2010/0313718 | A1 * | 12/2010 | Meidar | B23Q 1/012 82/122 |
| 2011/0079121 | A1 * | 4/2011 | Ishioka | B23B 3/065 82/1.11 |
| 2015/0224580 | A1 * | 8/2015 | Yamamoto | B23B 7/12 82/122 |

FOREIGN PATENT DOCUMENTS

| | | |
|---|---|---|
| EP | 1992434 A3 | 11/2008 |
| JP | 60-61103 U | 4/1985 |
| JP | 2004-066430 | 3/2004 |
| JP | 2007-000966 | 1/2007 |
| JP | 2353757 | 8/2011 |
| WO | WO 2010/064478 | 6/2010 |

OTHER PUBLICATIONS

Extended European Search Report for corresponding EP Application No. 12890576.7-1709, Feb. 16, 2016.

* cited by examiner

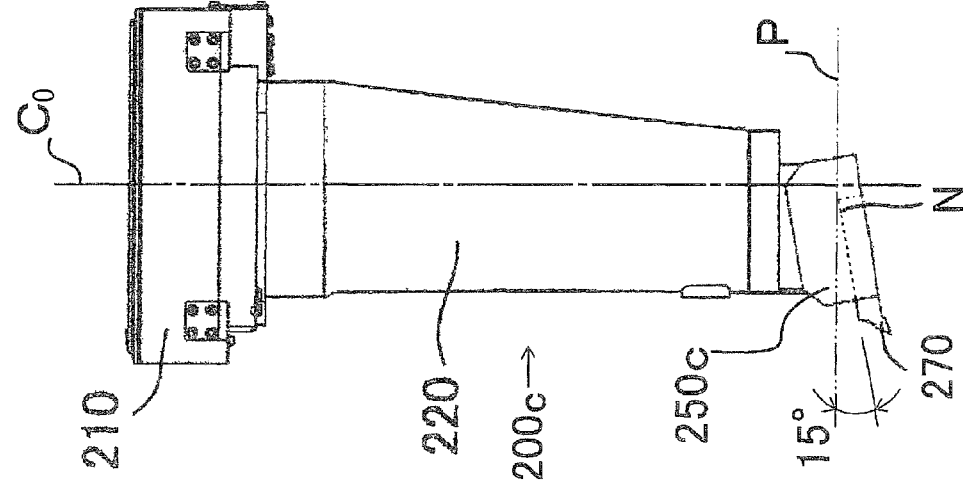
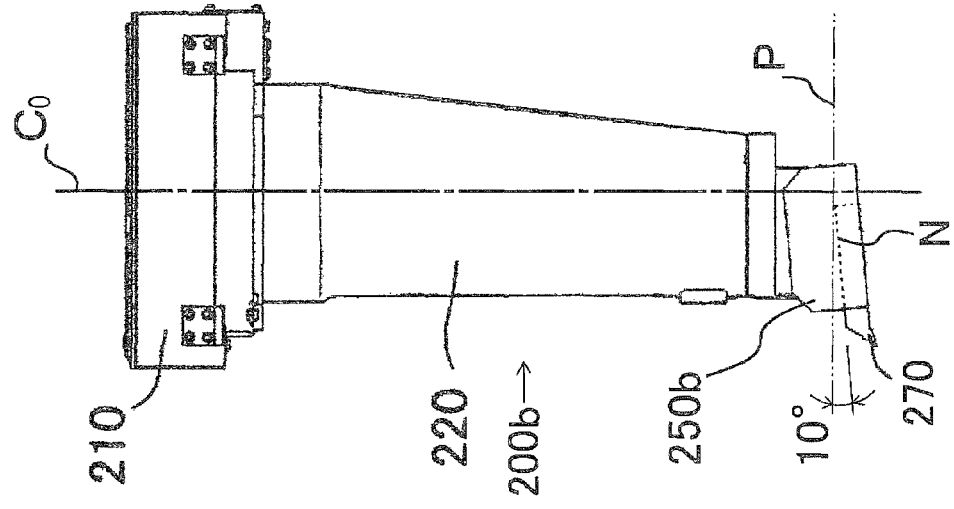
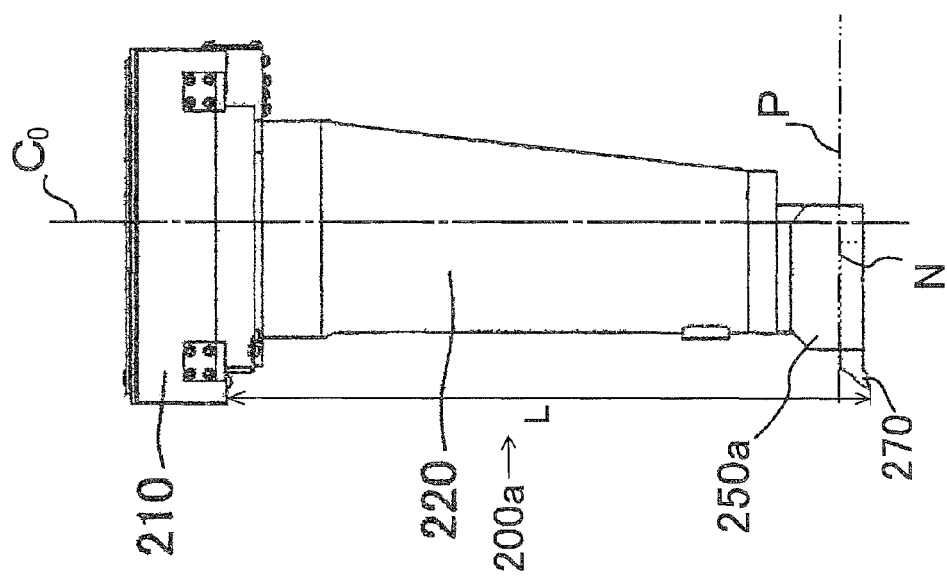

MACHINE TOOL

CROSS-REFERENCE TO RELATED APPLICATIONS

The present application is a continuation application of International Application No. PCT/JP2012/082986, filed Dec. 20, 2012. The contents of this application are incorporated herein by reference in their entirety.

BACKGROUND OF THE INVENTION

1. Field of the Invention

The present invention relates to a machine tool.

2. Discussion of the Background

Vertical lathes include a rotary table that turns about a vertical axis, and perform various processes such as turning, boring, tapping, and milling on a workpiece placed on the rotary table. One example of such a lathe is a multi-tasking lathe including a spindle head pivotable about a horizontal axis (B-axis) disposed on a tool rest movable in a Z-axial direction. The spindle head has a highly rigid structure, and includes a spindle switchable between a rotatable mode and an un-rotatable locked mode. The spindle is switched to the un-rotatable locked mode to mount a turning tool to the spindle. Then, a turning process is performed on the outer portion, inner portion, end surface of the workpiece placed on the rotary table. When the spindle is switched to the rotatable mode, a milling tool, a drilling tool, or a tapping tool is mounted to the spindle to perform milling, drilling, or tapping. However, the spindle head having high rigidity and pivoting about the B-axis has an outer shape having a large dimension. Such a large spindle head produces interference between the workpiece and the spindle, causing various limitations on the process of inner portions of workpieces to be deeply bored. Japanese Unexamined Patent Application Publication No. 2007-000966 discloses a composite machine tool including a tool rest movable in the Z-axial direction and a ram shaft for an internal deep boring process disposed in the tool rest to be movable parallel to a Z-axis, wherein an inner portion of a workpiece placed on a rotary table is subjected to an internal turning process with a turning tool mounted to the ram shaft to be deeply bored.

SUMMARY OF THE INVENTION

According to one aspect of the present invention, a machine tool includes a table, a spindle head, a spindle, and an internal turning attachment. The table has an upper face on which a workpiece is to be mounted and is rotatable around a vertical axis perpendicular to the upper face of the table. The spindle head is disposed above the table and is rotatable around a horizontal axis parallel to the upper face of the table. The spindle is disposed in the spindle head and is rotatable around a spindle rotational axis. The internal turning attachment is detachably mounted to the spindle head with a clamp mechanism. The internal turning attachment includes an attachment base, a body, and a tool holder. The attachment base has a base portion and a lower portion opposite to the base portion which is detachably mounted to the spindle head. The body has a body upper portion and a body lower portion. The body upper portion is fixed to the lower portion of the attachment base. The tool holder is mounted to the body lower portion. The tool holder has a tool mount surface to which a turning tool is detachably mounted. The tool mount surface provides a changeable tool mount angle with respect to a plane perpendicular to the spindle rotational axis in a state where the internal turning attachment is mounted to the spindle head. An angle between the spindle rotational axis and the vertical axis is to be larger than zero degree according to the changeable tool mount angle and is fixed while the turning tool contacts the workpiece in a case where the workpiece has a hole with a depth exceeding a length from the body upper portion to a tip end of the turning tool along the spindle rotational axis.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 6A to 6C are diagrams illustrating a tool holder;

DESCRIPTION OF THE EMBODIMENTS

Figure 1:
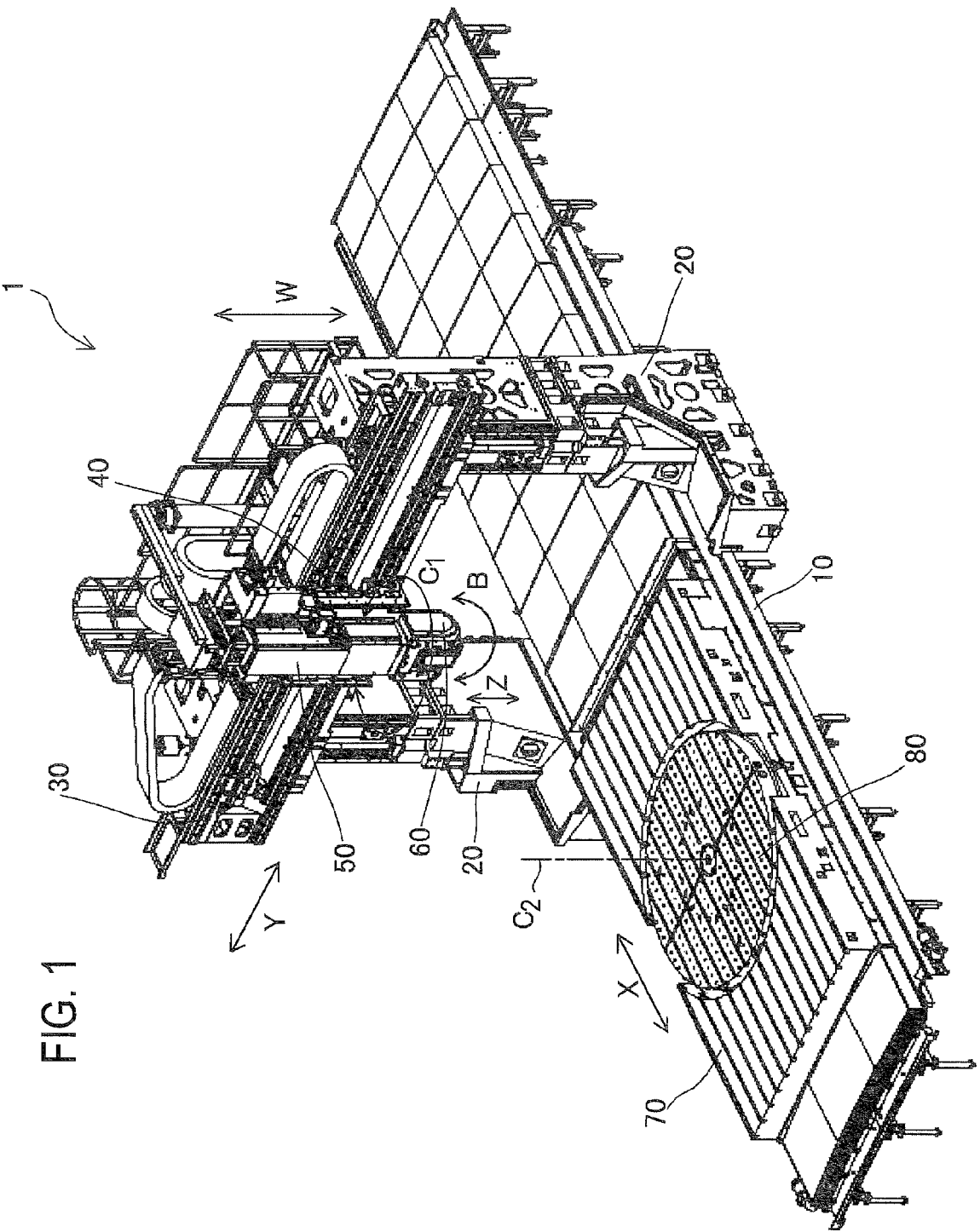
FIG. 1 is a perspective view of a machine tool including an internal turning attachment according to an embodiment of the present invention.

The embodiments will now be described with reference to the accompanying drawings, wherein like reference numerals designate corresponding or identical elements throughout the various drawings.

FIG. 1 is a perspective view of a general arrangement of a machine tool 1 including an internal turning attachment according to the embodiment of the present invention. The machine tool 1 includes a bed 10, and a portal column 20 disposed upright in a center portion of the bed 10 in the longitudinal direction of the bed 10. Between the columns 20, a cross rail 30 is disposed to be movable upward and downward in a direction of a vertical W-axis.

The cross rail 30 has a saddle 40 installed on the cross rail 30 to move on the cross rail 30 along a horizontal Y-axis. A ram 50 is installed on the saddle 40. The ram 50 is controlled to move relative to the cross rail 30 in a direction of a Z-axis parallel to the W-axis. To the ram 50, a spindle head support portion 60 is installed rotatably about a vertical $C_1$ axis.

The bed 10 has a table 70 disposed on the bed 10 to move on the bed 10 in an X-axial direction. The table 70 has a turning table 80 embedded into the center portion of the table rotatably about a $C_2$ axis, which is a rotation axis in the Z-axial direction.

Figure 2:
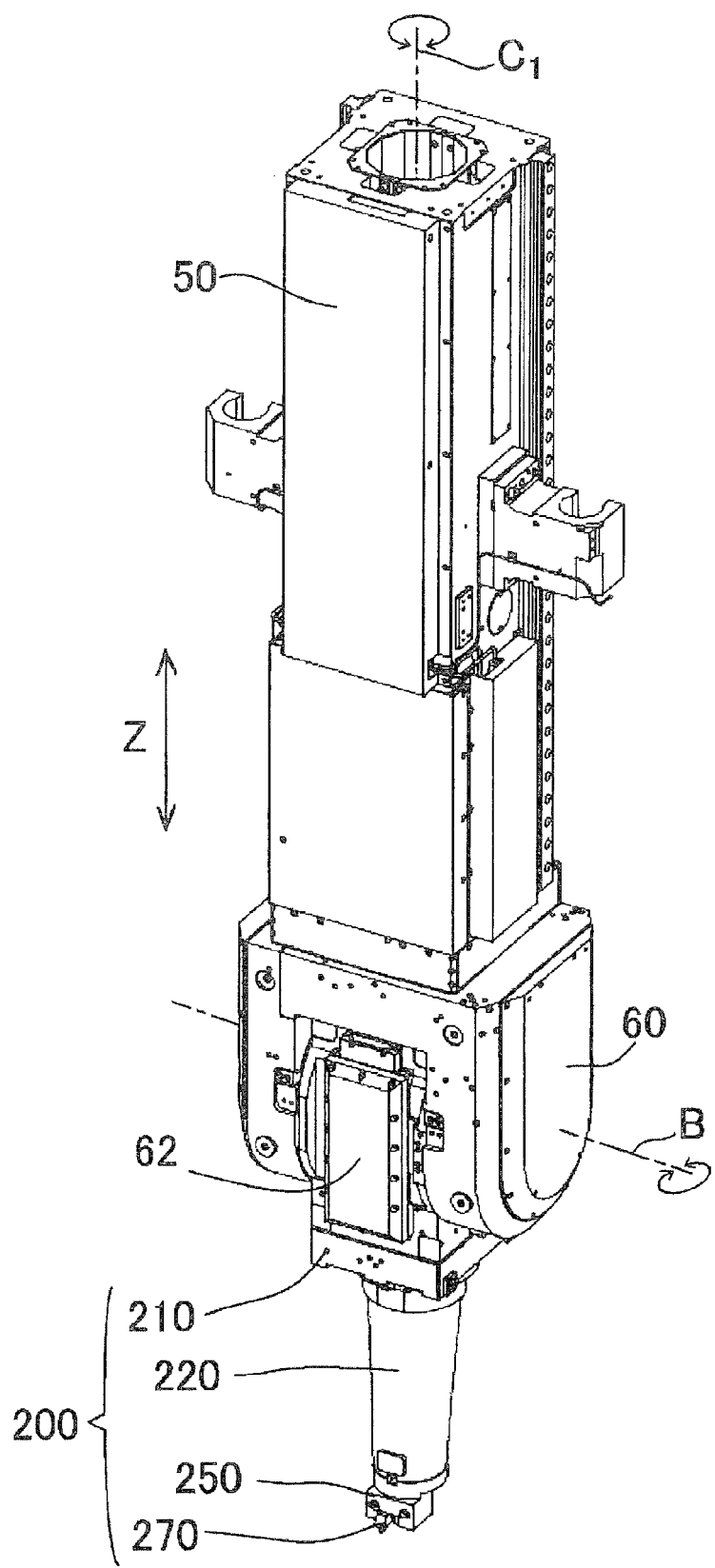
FIG. 2 is a perspective view of an internal turning attachment mounted on a spindle head.

FIG. 2 is a perspective view of the ram 50 and the spindle head support portion 60. The spindle head support portion 60 has a spindle head 62 on the spindle head support portion 60. The spindle head 62 is pivotable about a B-axis perpendicular to the Z-axis. The spindle head 62 has a spindle rotatably mounted in the spindle head 62.

An internal turning attachment 200 includes an attachment base 210, a body 220, and a tool holder 250.

The attachment base 210 in the internal turning attachment 200 is attached to and detached from the spindle head 62.

The body 220 is fixed to a lower portion of the attachment base 210. The bottom end surface of the body 220 is perpendicular to a spindle axis when the internal turning attachment 200 is mounted to the spindle head 62. The bottom end surface defines a surface for attaching the tool holder 250.

To the tool holder 250, a turning tool 270 is mounted.

Figure 3:
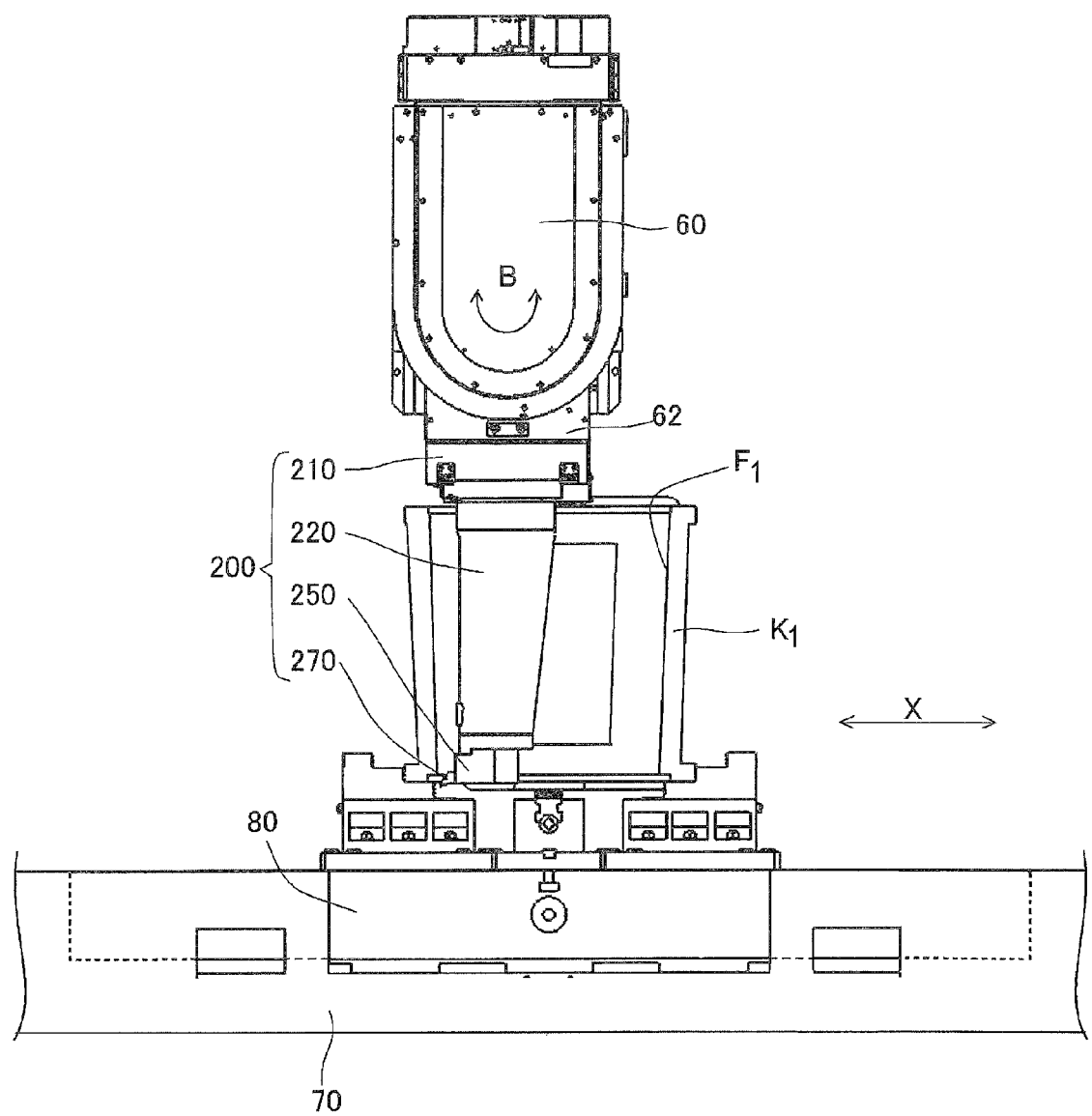
FIG. 3 is a diagram illustrating an operation of the internal turning attachment according to the embodiment of the present invention.

FIG. 3 is a diagram illustrating a state where a workpiece $K_1$ mounted to the turning table 80 is machined with the internal turning attachment 200 where the B-axis is 0°. FIG. 3 illustrates a workpiece $K_1$ cut along a line through a rotation center $C_2$ of the turning table 80 and parallel to the X-axial direction to easily understand whether interference occurs between the workpiece $K_1$ and the spindle head 62. The workpiece $K_1$ is shown in a similar manner in FIGS. 5, 8, and 9, described later.

Figure 4A:
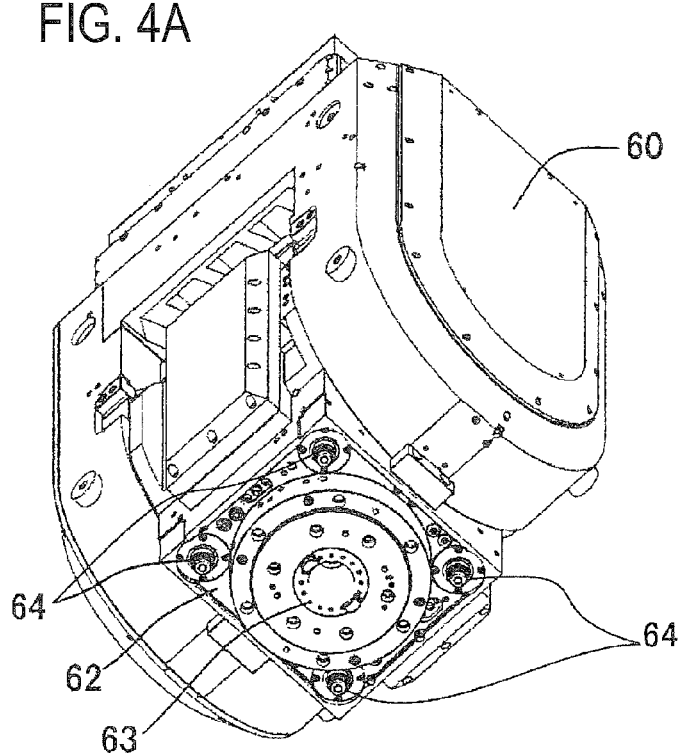
FIGS. 4A and 4B are diagrams illustrating a structure for mounting the attachment to a spindle head.
Figure 4B:
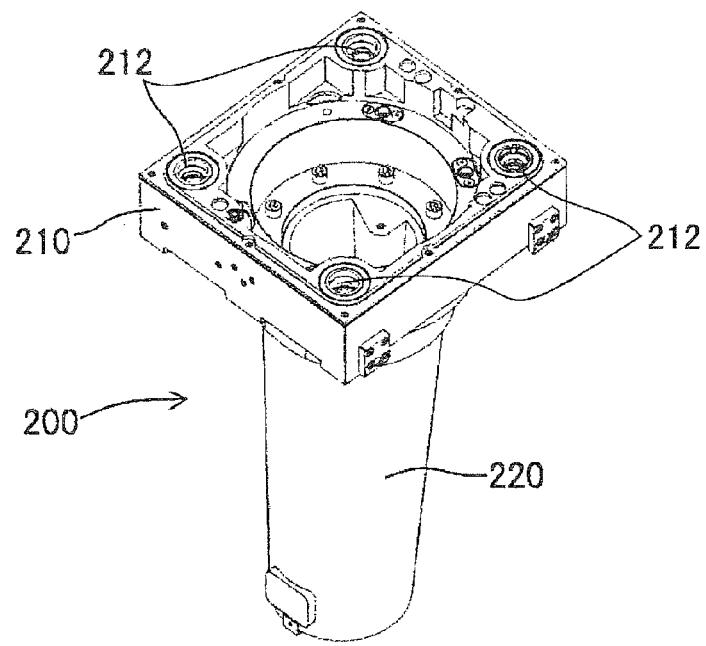

FIGS. 4A and 4B are diagrams illustrating an example of a structure for detachably attaching the internal turning attachment 200 to the spindle head 62.

The spindle head 62 includes a spindle 63 in the center of the spindle head 62. A lower end surface of the spindle head 62 includes four grip portions 64.

The attachment base 210 in the internal turning attachment 200 includes four grip holes 212 facing the respective grip portions 64 disposed in the spindle head 62. The grip portions 64 are inserted into the grip holes 212, and clamped. Thus, the internal turning attachment 200 is mounted to the spindle head 62. The gripping mechanism is similar to the gripping mechanism shown in FIG. 12, described later.

Figure 5B:
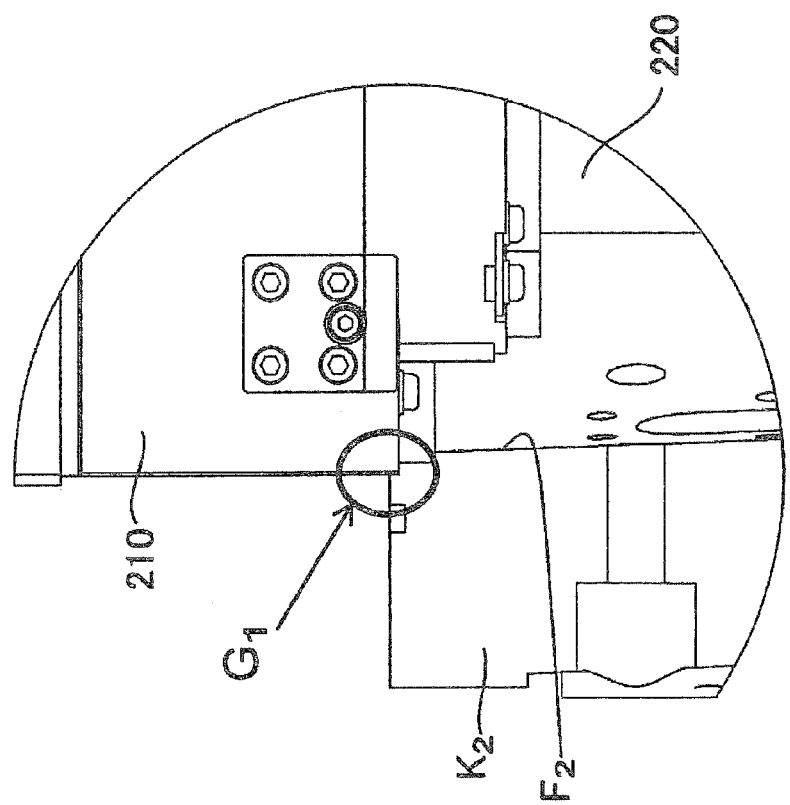
FIGS. 5A and 5B are diagrams illustrating a state where interference occurs.
Figure 5A:
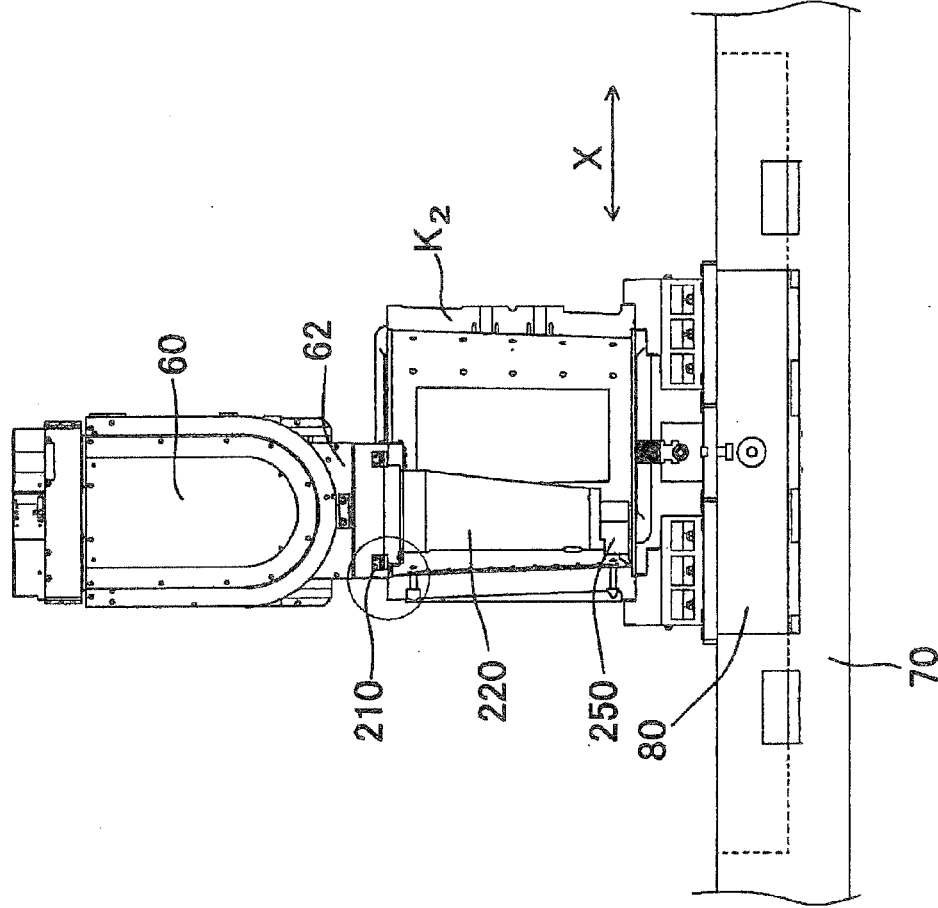

FIGS. 5A and 5B are diagrams illustrating a case where interference occurs between the internal turning attachment 200 and an inner portion $F_2$ of a workpiece $K_2$ during the process.

Specifically, when the spindle head 62 moves downward toward the inner portion $F_2$, an interference portion $G_1$ generates between the attachment base 210 in the internal turning attachment 200 and an entrance of the inner portion $F_2$.

To avoid the interference, the internal turning attachment 200 according to the embodiment of the present invention includes a 0° tool holder 250a for the B-axis at an angle of 0°, a 10° tool holder 250b for the B-axis at an angle of 10°, and a 15° tool holder 250c for the B-axis at an angle of 15°, as shown in FIGS. 6A to 6C. The respective tool holders are set at angles of 0°, 10°, and 15°. These angles are angles that a tool mount surface N forms with a plane P perpendicular to the line $C_0$, with which the spindle axis is aligned, when the attachment is mounted to the spindle. The angle formed by the plane P and the tool mount surface N is referred to as a tool mount angle.

Hereinafter, the internal turning attachment 200 having the 0° tool holder 250a mounted to the internal turning attachment 200 is referred to as an internal turning attachment 200a, the internal turning attachment 200 having the 10° tool holder 250b mounted to the internal turning attachment 200 is referred to as an internal turning attachment 200b, and the internal turning attachment 200 having the 15° tool holder 250c mounted to the internal turning attachment 200 is referred to as an internal turning attachment 200c.

Figure 7:
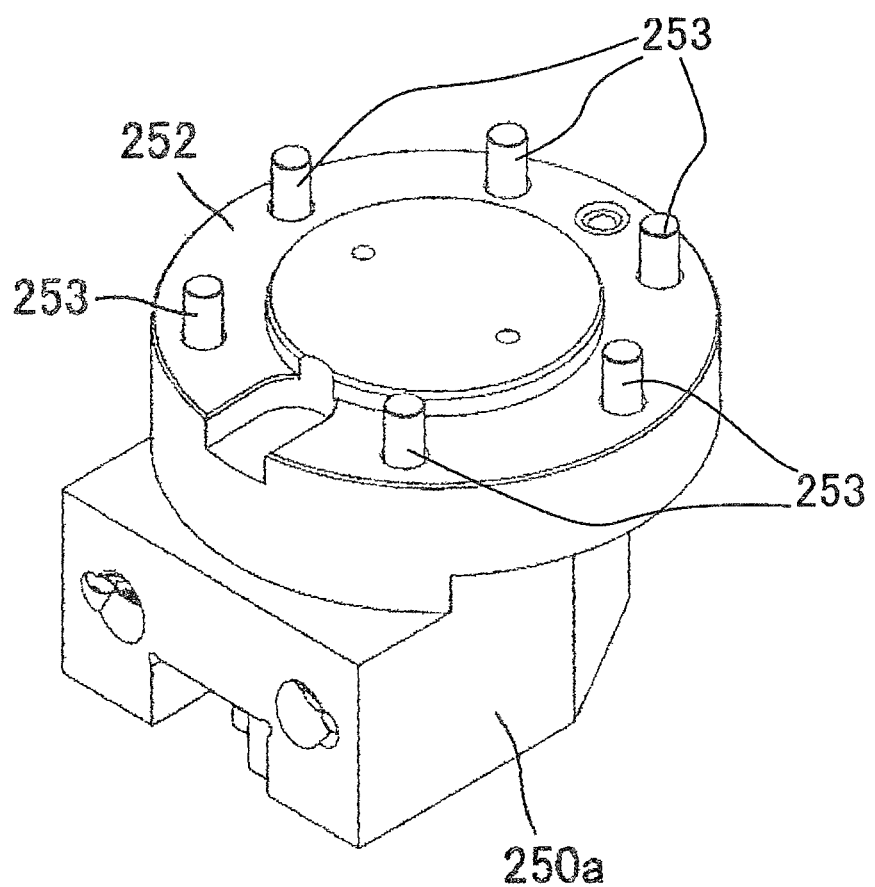
FIG. 7 is a diagram illustrating another tool holder.

FIG. 7 is a view of a tool holder 250 for manual replacement, illustrating a structure of the tool holder 250 to be mounted to an attachment body 220 with a mount flange 252 of the tool holder 250 and six bolts 253.

When the same workpiece is continuously machined and the frequency of set-up is low, the tool holder for manually replacement also can sufficiently exhibit the effect at low cost.

Figure 8:
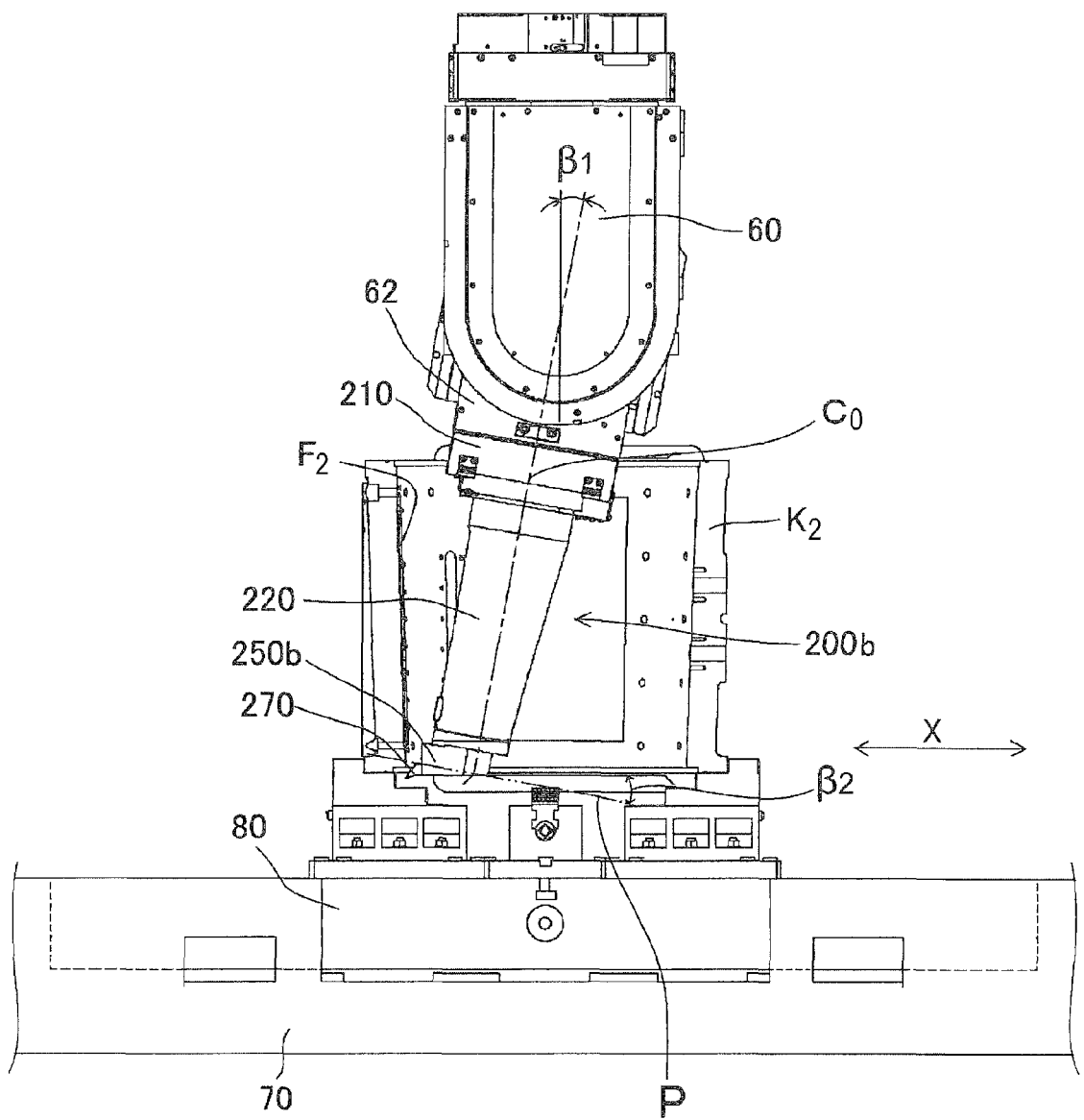
FIG. 8 is a diagram illustrating an operation of the internal turning attachment according to the embodiment of the present invention.

FIG. 8 is a diagram illustrating a state where the 10° tool holder 250b having the tool mount angle of 10° expressed by $\beta_2$ is mounted to the body 220, and the spindle head 62 is 10° pivoted about the B-axis expressed by $\beta_1$ and positioned.

The B-axis of the spindle head is pivoted by an identical angle to the tool mount angle to be positioned. This operation enables the blade tip of the turning tool mounted to the tool holder to contact the workpiece at a right angle.

In this state, the blade tip of the tool is brought into contact with the inner portion $F_2$ of the workpiece $K_2$ with the turning table 80 being rotated. This operation avoids the interference between the internal turning attachment 200b and the inner portion $F_2$, machining the workpiece without fail.

Specifically, when the portion to be bored is located at a depth exceeding a length L of the attachment projected from the spindle head and the B-axis has an angle of 0°, the attachment base undesirably interferes with the workpiece. To avoid this interference, the position of the B-axis of the spindle head is slightly changed to dispose the spindle head spaced from the workpiece. This changed position of the B-axis also changes the angle formed by the tool and the workpiece. To correct the change in the angle, the tool mount angle is changed as above.

Figure 9:
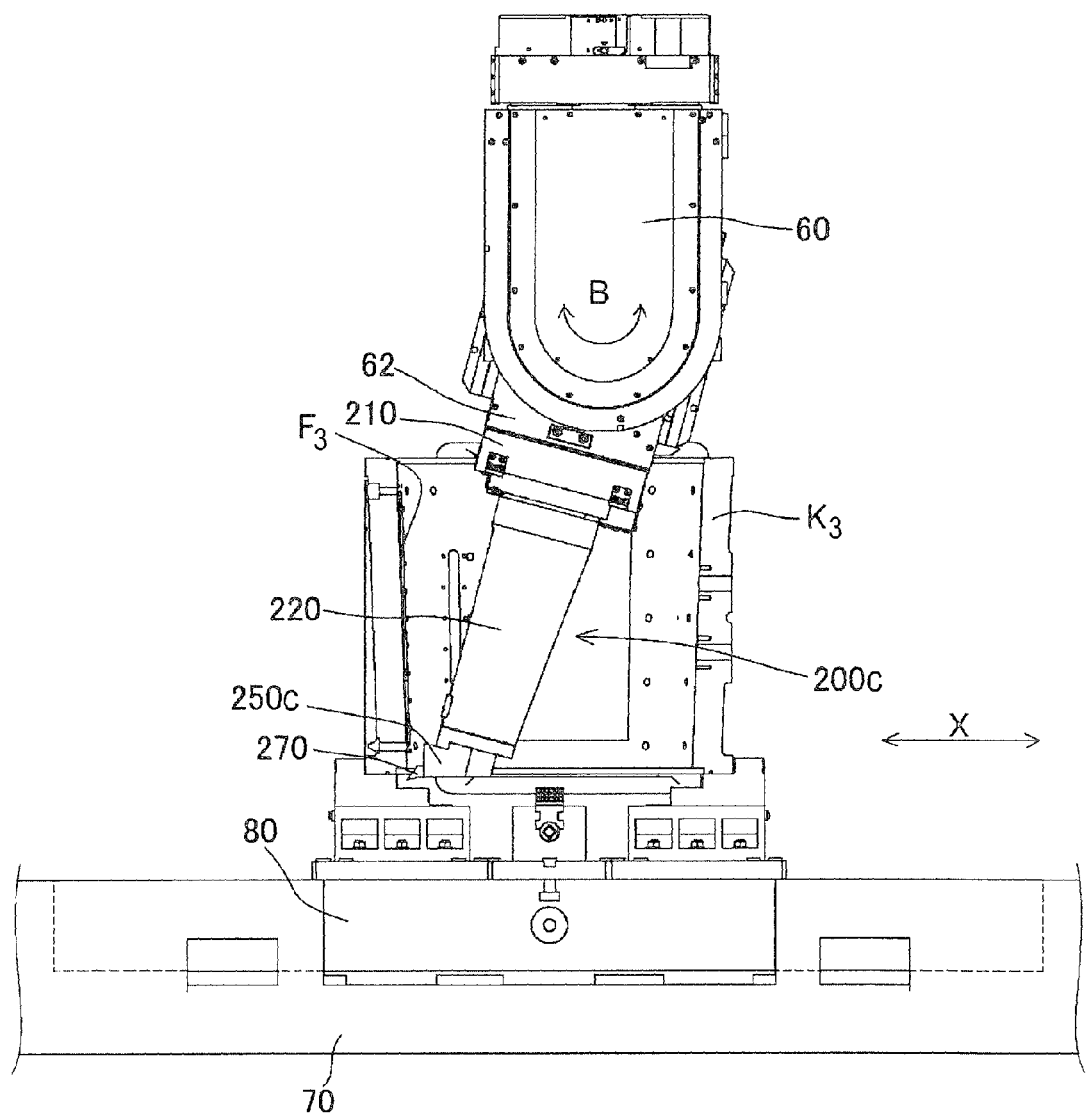
FIG. 9 is a diagram illustrating an operation of the internal turning attachment according to the embodiment of the present invention.

FIG. 9 is a diagram illustrating a state where the 15° tool holder 250c is mounted to the body 220, and the spindle head 62 is 15° pivoted about the B-axis and clamped.

Thus, as the angle to pivot about the B-axis is greater, the distance between the spindle head and the workpiece is longer. Meanwhile, the spindle head on the side opposite to the blade tip may possibly interfere with the workpiece. However, as in this example, when the workpiece has a sufficiently large inner diameter, the inner portion of the workpiece is machined without interfering with the workpiece $K_3$ if the B-axis angle is further changed.

Thus, the tool mount angle is properly selected depending on the workpiece and the B-axis is positioned in accordance with the tool mount angle. Then, the workpiece is subjected to the internal turning process of the workpiece to bore a deep hole in the workpiece without sacrificing rigidity and producing interference.

Figure 10A:
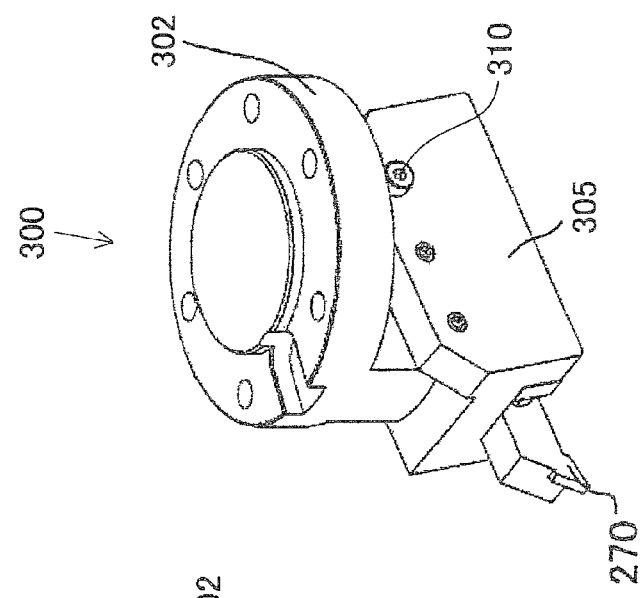
FIGS. 10A to 10C are diagrams illustrating another example of the tool holder.
Figure 10B:
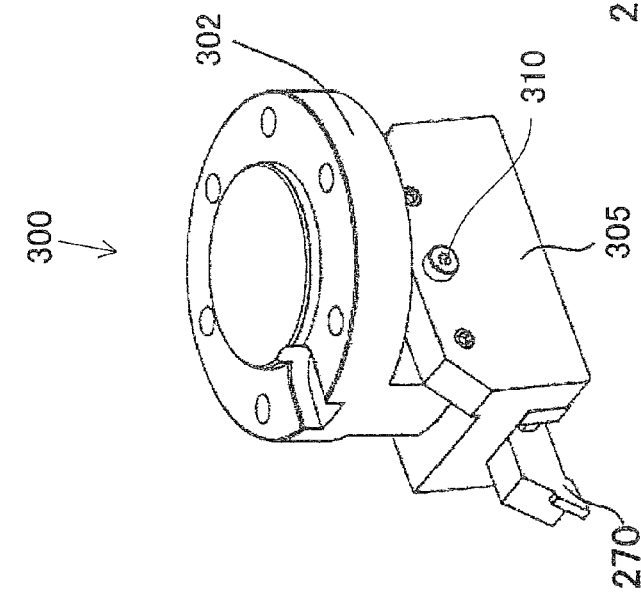
Figure 10C:
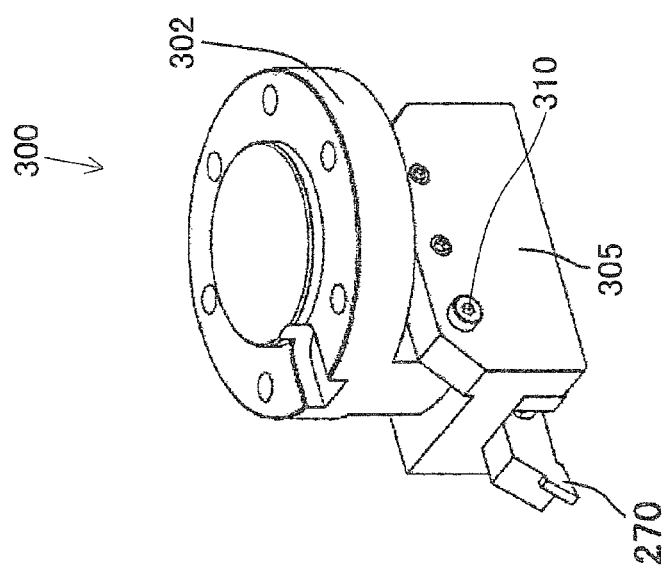

FIGS. 10A to 10C are diagrams illustrating an example of a single tool holder 300, which is capable of adjusting the mount angle of the turning tool 270.

The turning tool 270 is fixed to a tool mounting member 305, and the tool mounting member 305 is mounted to the body mounting member 302 pivotably about a pin not shown. The tool mounting member 305 and the body mounting member 302 respectively include angle bolt holes and tapped holes to fix the tool mount angles of 0°, 10°, and 15°, respectively. A bolt 310 is screwed into the leftmost bolt hole in (a) in the diagram to fix the turning tool 270 at 0°, into the central bolt hole in (b) in the diagram to fix the turning tool 270 at 10°, and into the rightmost bolt hole in (c) in the diagram to fix the turning tool 270 at 15°.

The turning tool 270 may be designed such that the tool mount angle is changed to any angle.

The tool holder of this type is also effective when the frequency of set-up is lower. Additionally, the tool holder of this type may not necessarily be provided in plural, which is advantageous in cost.

Figure 11B:
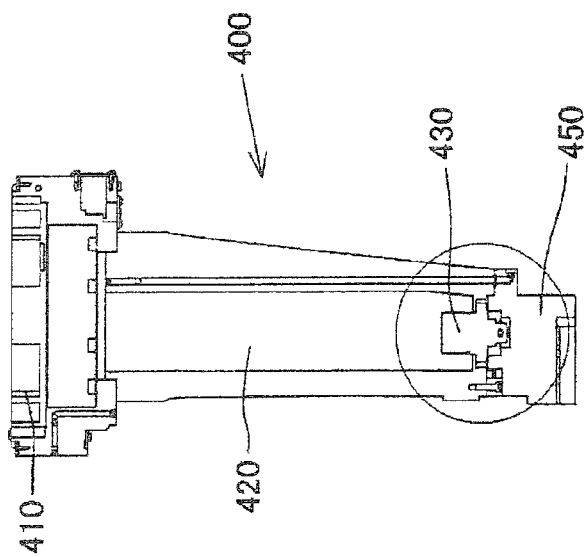
FIGS. 11A to 11C are diagrams illustrating an automatic replacing device for the tool holder.
Figure 11C:
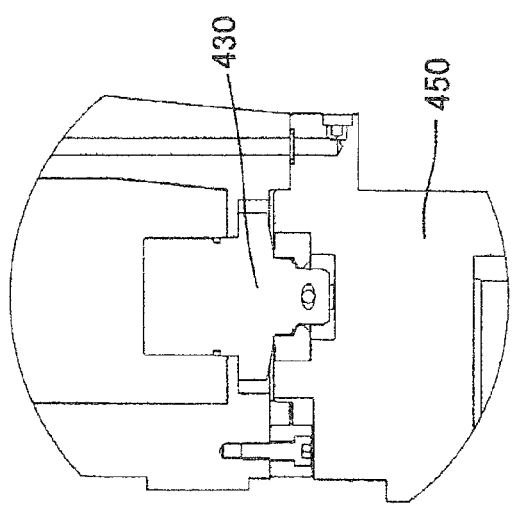
Figure 11A:
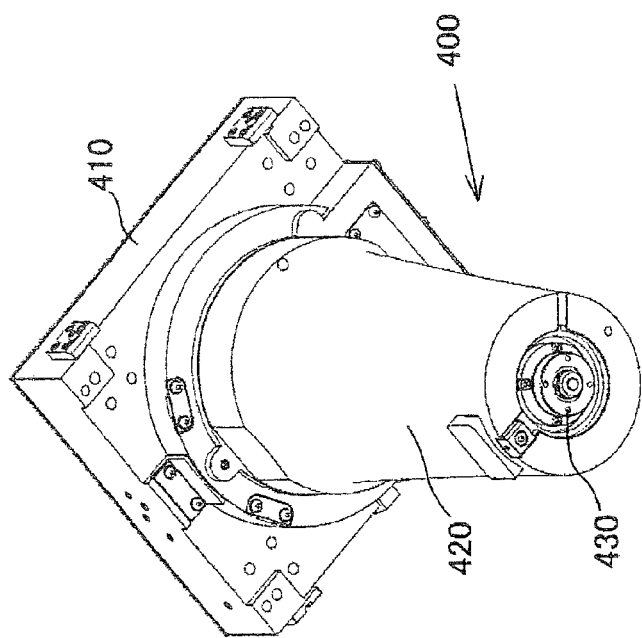

FIGS. 11A to 11C are diagrams illustrating an example of the internal turning attachment having a structure enabling automatic replacement of the tool holders having different tool mount angles.

A tool holder automatic replacement type internal turning attachment 400 includes an attachment base 410 and a body 420 mounted to the attachment base 410. The distal end portion of the body 420 has a grip portion 430. The grip portion 430 is mechanically operated to automatically replace the tool holders 450 having different turning tool mount angles. Specifically, a tool holder storage is disposed within a spindle movable area. The tool holder storage includes a plurality of stands, and the respective tool holders are horizontally placed on the stands with the mount flange facing upward. After the tool holder automatic replacement type internal turning attachment 400 is placed on an empty stand and positioned, the grip portion 430 is unclamped to release the tool holder onto the stand. Then, the attachment 400 is positioned for another tool holder placed on another stand, and the grip portion 430 is clamped. Thus, the tool holder 450 is automatically replaced.

Thus, two or more tool holders having different tool mount angles are kept within the spindle movable area, and automatically replaced. This enables frequent set-up and the processing of different portions in the same workpiece with the attachments having different tool mount angles. When the workpiece is machined with the tool holder having a tool mount angle of 10° or 15° at an angle of the B-axis of 10° or 15°, a component in the X-axial direction in the length from an attachment support portion to the blade tip is slightly longer than that at an angle of the B-axis of 0°, causing disadvantages in rigidity. When chattering occurs, and if no interference occurs between the 0° tool holder and the workpiece, the 0° tool holder may possibly attain good process results.

Figure 12:
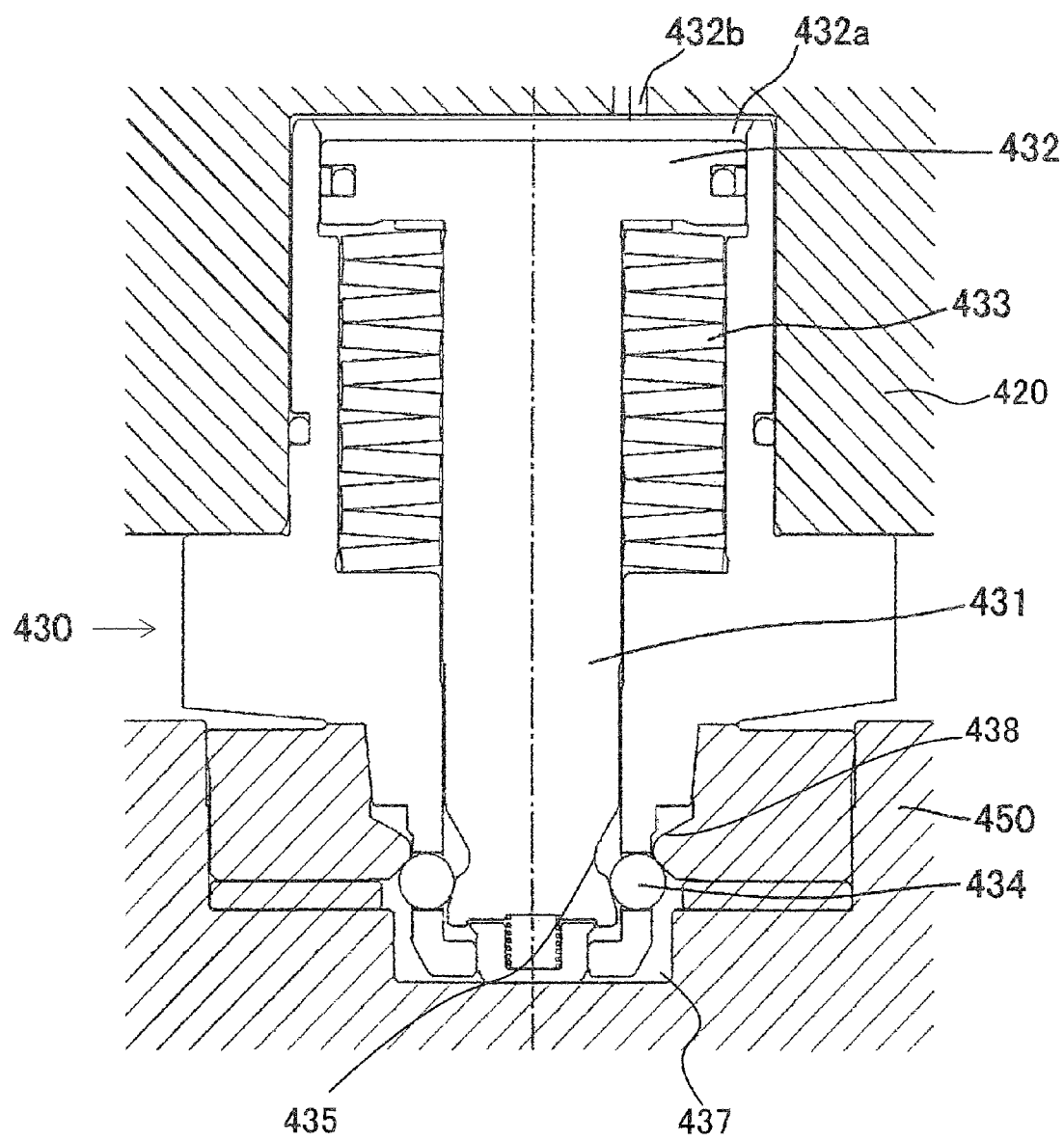
FIG. 12 is a diagram illustrating a clamp mechanism for the tool holder.

FIG. 12 is a diagram illustrating a gripping mechanism for the grip portion 430 in detail.

The tool holder 450 includes a grip hole 437 having a protrusion portion 438.

The grip portion 430 includes a hydraulic chamber 432a having a drawbar 431 and a piston 432 integrated with the drawbar 431. Hydraulic pressure is applied to the hydraulic chamber 432a from the spindle side via a passage 432b. The tool holder 450 is pushed with the drawbar 431 to release the clamp, and a ball 434 is accommodated into a depression portion 435. Thus, the tool holder 450 is unclamped. When hydraulic pressure is not applied, a spring 433 moves the drawbar 431 in a direction to draw back the tool holder 450, and the ball 434 grasps the tool holder 450.

Figure 13A:
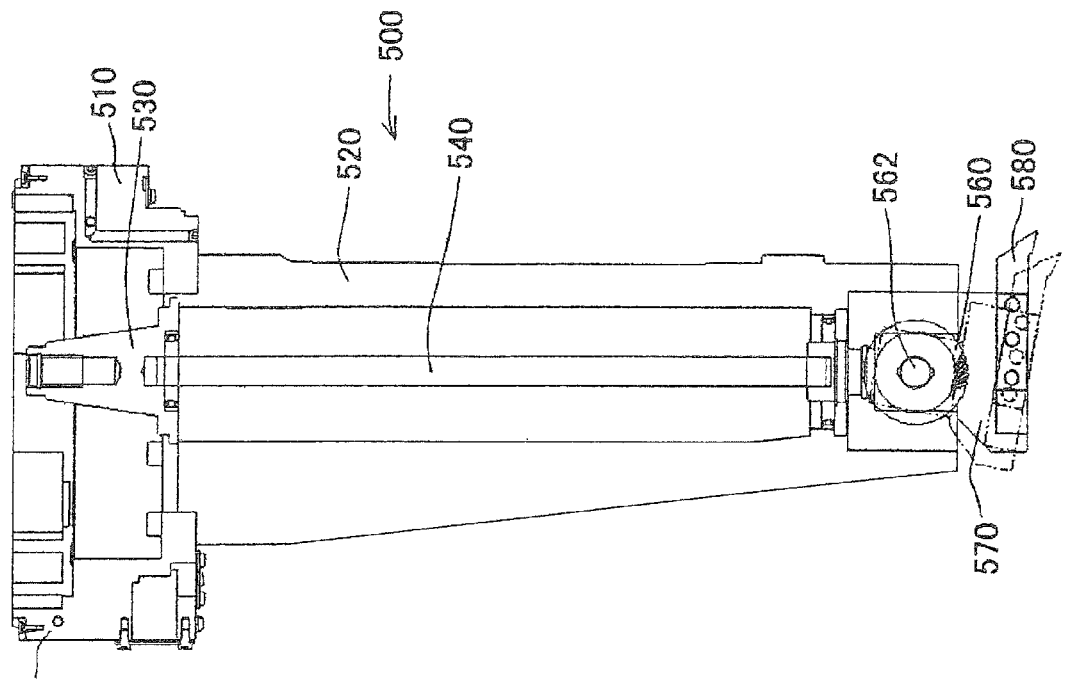
FIGS. 13A and 13B are diagrams illustrating an automatic angle changing mechanism for the tool holder.
Figure 13B:
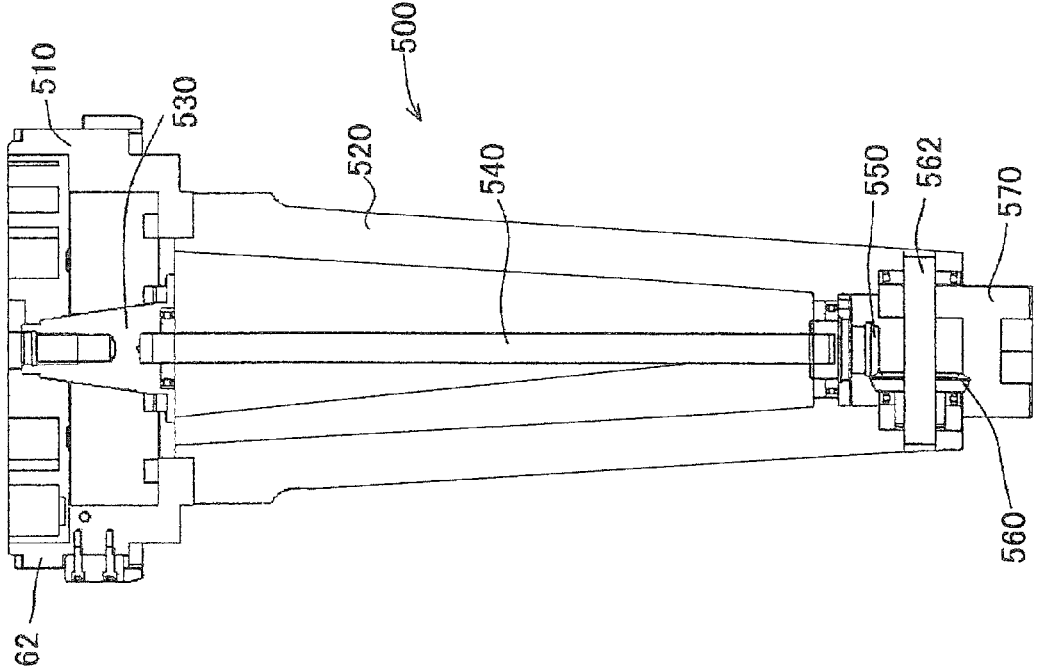

FIGS. 13A and 13B are diagrams illustrating an example of the internal turning attachment having a structure in which a driving force of the spindle is utilized to automatically change the tool mount angle in the tool holder.

A tool holder rotating type internal turning attachment 500 includes an attachment base 510 to be mounted to the spindle head 62. The attachment base 510 includes a spindle shank 530 in the center portion of the attachment base 510, and is inserted into the spindle in the spindle head 62. The rotational force of the spindle shank 530 is transmitted via a drive shaft 540 to a bevel gear 550 disposed in the distal end portion of the body 520. The body 520 has a support shaft 562 mounted to the body 520, and supports a bevel gear 560 together with a tool holder 570 to mesh the bevel gear 560 with the bevel gear 550. Thus, the rotation of the bevel gear 550 is changed by 90°, and transmitted to the bevel gear 560. The rotation of the bevel gear 560 automatically changes the tool mount angle in the tool holder 570, which supports a turning tool 580.

As has been described hereinbefore, the tool mount angle is changed by the rotation of the spindle. The rotational angle of the spindle is controlled to set the mount angle at any angle. The tool mount angle is changed to any angle to avoid the interference between the workpiece and the attachment as occasion arises. Such a configuration increases the freedom of the program for the process. Additionally, chattering can be eliminated by adjusting the tool amount angle slightly.

The automatic change of the tool mount angle leads to improved process efficiency because the process conditions including the tool mount angle can be freely changed while one workpiece is being machined.

Thus, by controlling the B-axis of the spindle head in the machine tool, the internal turning attachment according to the embodiment of the present invention can deep cut an inner portion of a workpiece to be bored which is located at a depth exceeding the length of the attachment projected from the spindle head.

Obviously, numerous modifications and variations of the present invention are possible in light of the above teachings. It is therefore to be understood that within the scope of the appended claims, the invention may be practiced otherwise than as specifically described herein.

What is claimed is:

1. A machine tool comprising:
   a table having an upper face on which a workpiece is to be mounted and being rotatable around a vertical axis perpendicular to the upper face of the table;
   a spindle head disposed above the table and being rotatable around a horizontal axis parallel to the upper face of the table;
   a spindle disposed in the spindle head and being rotatable around a spindle rotational axis; and
   an internal turning attachment detachably mounted to the spindle head with a clamp mechanism, the internal turning attachment comprising:
   an attachment base having a base portion and a lower portion opposite to the base portion which is detachably mounted to the spindle head;
   a body having a body upper portion and a body lower portion, the body upper portion being fixed to the lower portion of the attachment base; and
   a tool holder mounted to the body lower portion, the tool holder having a housing including a tool mount surface to which a turning tool is detachably mounted, the tool holder having a changeable tool mount angle with respect to a plane perpendicular to the spindle rotational axis when the internal turning attachment is mounted to the spindle head, an angle between the spindle rotational axis and the vertical axis being larger than zero degrees according to the changeable tool mount angle and being fixed while the turning tool contacts the workpiece when the workpiece has a hole with a depth exceeding a length from the body upper portion to a tip end of the turning tool along the spindle rotational axis, wherein when the tool mount angle is changed, a position of a lower surface of the housing changes relative to the spindle rotational axis.

2. A machine tool system comprising:

a machine tool having:

a table having an upper face on which a workpiece is to be mounted and being rotatable around a vertical axis perpendicular to the upper face of the table;

a spindle head disposed above the table and being rotatable around a horizontal axis parallel to the upper face of the table;

a spindle disposed in the spindle head and being rotatable around a spindle rotational axis;

an internal turning attachment detachably mounted to the spindle head with a clamp mechanism, the internal turning attachment comprising:

an attachment base having a base portion and a lower portion opposite to the base portion which is detachably mounted to the spindle head;

a body having a body upper portion and a body lower portion, the body upper portion being fixed to the lower portion of the attachment base; and a tool holder mounted to the body lower portion, the tool holder having a tool mount surface to which a turning tool is detachably mounted, the tool holder having a changeable tool mount angle with respect to a plane perpendicular to the spindle rotational axis when the internal turning attachment is mounted to the spindle head, an angle between the spindle rotational axis and the vertical axis being larger than zero degrees according to the changeable tool mount angle and being fixed while the turning tool contacts the workpiece when the workpiece has a hole with a depth exceeding a length from the body upper portion to a tip end of the turning tool along the spindle rotational axis; and a plurality of tool holders having different tool mount surfaces to which the turning tool is detachably mounted, wherein the different tool mount surfaces provide different tool mount angles with respect to the plane perpendicular to the spindle rotational axis in a state where the internal turning attachment is mounted to the spindle head, and wherein the tool holder is replaced with one of the plurality of tool holders to change the changeable tool mount angle.

3. The machine tool according to claim 1, wherein while a turning process is performed, a positioning angle for positioning a pivot axis of the spindle head is defined such that the positioning angle is approximately equal to the changeable tool mount angle.

4. The machine tool system according to claim 2, wherein while a turning process is performed, a positioning angle for positioning a pivot axis of the spindle head is defined such that the positioning angle is approximately equal to the changeable tool mount angle.

5. The machine tool according to claim 1, wherein the tool mount angle is changeable by manual or automatic replacement of the tool holder, or the tool mount angle is changeable by varying a position of the lower surface of the housing of the tool holder and a position of the tip end of the turning tool relative to the spindle rotational axis.

6. A machine tool comprising:

a table having an upper face on which a workpiece is to be mounted and being rotatable around a vertical axis perpendicular to the upper face of the table;

a spindle head disposed above the table and being rotatable around a horizontal axis parallel to the upper face of the table;

a spindle disposed in the spindle head and being rotatable around a spindle rotational axis; and an internal turning attachment detachably mounted to the spindle head with a clamp mechanism, the internal turning attachment comprising:

an attachment base having a base portion and a lower portion opposite to the base portion which is detachably mounted to the spindle head;

a body having a body upper portion and a body lower portion, the body upper portion being fixed to the lower portion of the attachment base; and a tool holder mounted to the body lower portion, the tool holder having a housing and a tool mount surface to which a turning tool is detachably mounted, the tool holder forming a tool mount angle with respect to a plane perpendicular to the spindle rotational axis when the internal turning attachment is mounted to the spindle head, an angle between the spindle rotational axis and the vertical axis being larger than zero degrees, the angle between the spindle rotational axis and the vertical axis being fixed to the angle larger than zero degrees while the turning tool contacts the workpiece, the tool mount angle being changeable and the angle between the spindle rotational axis and the vertical axis being changeable to correspond to the changed tool mount angle, wherein when the tool mount angle is changed, a position of a lower surface of the housing changes relative to the spindle rotational axis.

* * * * *